Jan. 9, 1951  E. B. GATTEN  2,537,047
OPHTHALMIC LENS FOR SPECTACLES AFFORDING
INCREASED FIELD OF VISION
Filed Nov. 17, 1947
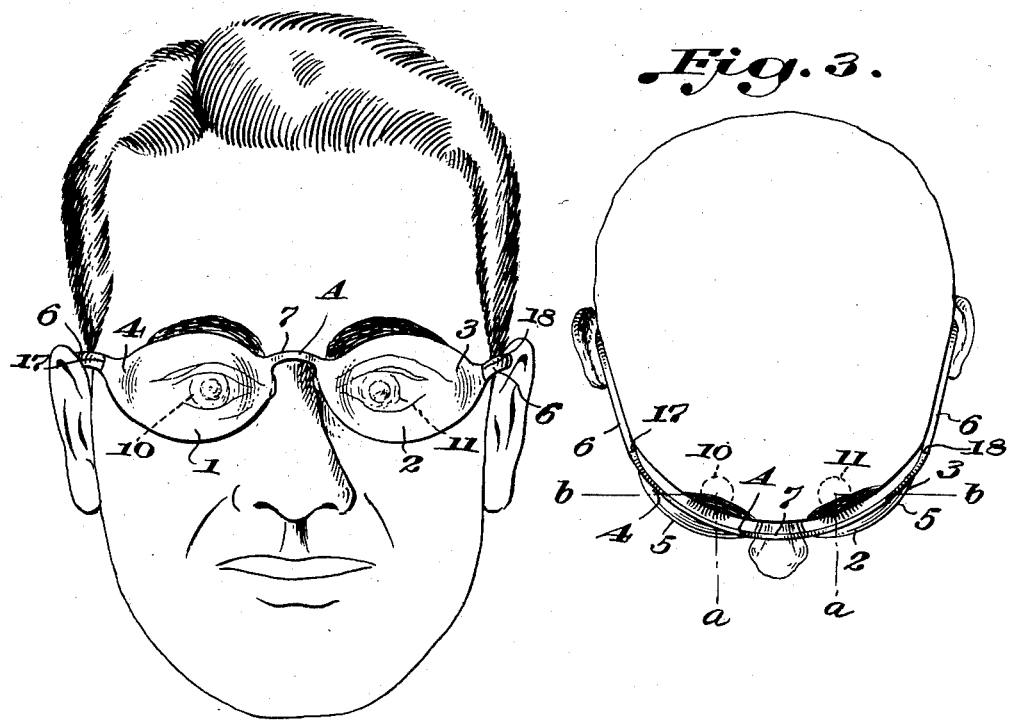
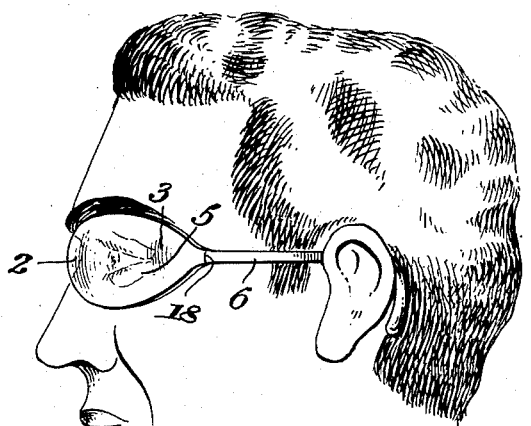
Inventor
Ernest B. Gatten
By Mason & Hatfield
attys.

Patented Jan. 9, 1951

2,537,047

UNITED STATES PATENT OFFICE 2,537,047

OPHTHALMIC LENS FOR SPECTACLES AFFORDING INCREASED FIELD OF VISION

Ernest B. Gatten, Richmond, Va.

Application November 17, 1947, Serial No. 786,401

8 Claims. (Cl. 88—54)

This invention relates to an ophthalmic lens for spectacles or eye glasses, and particularly to a lens, having the following objects:

An ophthalmic lens constructed either of glass or of plastic material having an enlarged field of vision, and in particular a field of vision which includes objects to the side of the user in order that the user may see to either side without turning his head.

An ophthalmic lens, said lens being ground or molded to individual prescription, having an enlarged field of vision.

Spectacles including a pair of lenses which if constructed of plastic material may be of one piece and is provided with an improved field of vision.

Spectacles provided with lenses which are constructed to correct the two principal meridians of the eye, said lenses being provided with a widened field of vision.

Spectacles having lenses ground or molded to correct the two principal meridians of the eye, said lenses being also curved to conform to the general curvature of the brows or temples of the user.

Other objects will appear hereinafter throughout the specification.

In the drawings:

Figure 1 is a front elevational view of the head of an individual equipped with spectacles provided with a pair of the improved lenses;

Figure 2 is a side elevational view of the individual equipped with the spectacles shown in Figure 1;

Figure 3 is a top plan view of the spectacles shown in Figures 1 and 2 and showing in outline how the lenses have been fitted to the cranium of an individual.

Throughout the specification the spectacles will generally be described as constructed of glass and being ground to individual requirements, but it is to be understood, of course, that the spectacles including the lenses may be of so-called plastic material, and when constructed of plastic material they may be of one piece.

It has long been realized that present day spectacles do not serve the needs of the individual user. For instance, when driving an automobile, assuming the driver requires glasses which have been ground to prescription, i. e., distance glasses, there are portions of the eyes which look straight ahead. Simultaneously, and without turning the eyes, objects which are passing to the right and left also may be at least partially seen. These side objects are greatly blurred due to the fact that the driver does not have complete vision, even when turning the eyes from a direction straight in front of him to either side. By the present invention this defect is cured. As the present spectacles provide lenses which are curved, preferably in the shape of the user's head about the temples, and are ground so that objects on the side of the user may be seen without turning the head. The lenses of the present invention, therefore, most closely approximate the field of vision which an individual would have should he not be required to wear glasses.

In other words, with the present invention the user, while looking straight ahead, can see certain objects to the side which he would not ordinarily be able to see clearly, and he may also turn his eyes to the side without turning his head and even more clearly see such objects.

In the drawings, the letter A indicates generally a pair of spectacles, these spectacles being provided with lenses whose principal portions are indicated at 1 and 2. These lenses are ground (or molded) to prescription on a compound base curve. The numerals 3 and 4 indicate extensions for said lenses 1 and 2, respectively, said lenses also being ground on the same or substantially the same base curve as the principal portions 1 and 2 of the lenses. As seen in Figure 3, the radius of curvature which forms the principal portion 1 is the same inner radius of curvature as the extension 4, and this radius generally conforms to the temple of the user. The other principal portion 2 and its extension 3 are, of course, similarly formed. In other words, the principal portions of each lens and the extensions thereof are ground to the individual's needs, and the inner curvature of the principal portion and the extension of each lens is of a radius which closely approximates the curvature of the temple of the individual for whom the glasses have been made.

The inner surface of the lens is a toric curvilinear surface which is continuous, and the horizontal meridian of said surface, throughout the entire 90° hereinafter mentioned, is preferably on the same radius.

As indicated in Figures 2 and 3, the outer curvature on the horizontal and vertical meridians is indicated at 5.

The numeral 6 indicates the spectacle temples and 7 the bridge.

Referring again to Figures 1 and 3, the eyes of the user are shown at 10 and 11, and where ground glasses are used, the junctions of the temples with the lens extensions are indicated at 17 and 18.

Referring again to Figures 1 to 3, it will be noted that the angle of vision designated by lines $a, b$ is in excess of 90°, whereas in glasses having no curvature in a horizontal plane this angle of vision includes little more than one-half of the 90° angle.

By reference to Figure 3 of the drawings, it will be seen that the broken lines $a$ indicate a line directly in front of the eye pupils of the users in this figure. The lines $b$ in Figure 3, indicate a line at right angles to the said lines *a* directly in front of the eye pupils of the users.

Comparison of present day ophthalmic lenses, i. e., those which are ground or otherwise formed to individual prescriptions, with the improvement described and shown herein discloses the following:

The type of spectacle lens in most general use at the present time is the toric lens. Toric lenses have a —6.00 or —8.00 diopter base curve depending on which is most suitable for the focus desired. Thus a +1.00 diopter spherical lens can be produced by grinding a —6.00 diopter inside curve and a +7.00 diopter outside curve. In a spherical lens the minus curvature is the same in all meridians and the plus curvature is the same in all meridians.

If, for some reason, it is desirable to grind a +1.00 spherical lens using a compound base curve, it could be accomplished by grinding an inside curve of —6.00 diopters in, for example, the 90° meridian and —7.00 in the 180° meridian. The plus curves used would then be +7.00 diopters in the 90° meridian and +8.00 in the 180° meridian. Compound lenses would be produced by increasing or decreasing one or both of the plus curves. For example, if a +1.00 diopter sphere combined with a +1.00 diopter cylinder was wanted in the above example, the +7.00 diopter curve could be increased to +8.00 diopters or the +8.00 diopter curve to +9.00 diopters depending on the axis wanted.

A compound lens of +1.00 diopter sphere combined with +1.00 diopter cylinder and using the same —6.00 diopter base curve can be produced by grinding —5.00 diopter spherical curve on the concave side and a +6.00 diopters = +7.00 diopters curves on the convex side, the resultant lens affording a power of +1.00 diopter in all meridians and an additional +1.00 diopter of lens power in one meridian.

The above method is common practice in grinding spherical and compound lenses at the present time.

Due to the normal upward and downward movements of the human eye and the limitation of the vertical field of vision due to eyebrows and cheeks, the —6.00 or —8.00 diopter base curve now used for toric lenses is entirely adequate to cover the normal vertical field of vision. The horizontal movements of the eye, however, are not so well treated, and not more than two-thirds of the horizontal field of vision is covered by a pair of lenses of spectacles. There is a large area on the temple sides of a pair of lenses of spectacles in which the wearer can with normal eye movements see around his glasses.

The lens of the present invention would be ground on such a compound base curve as the above curve for the following reasons.

In looking down on the human cranium it appears that the general curve of the brows would correspond to a deep lens curve of something between —10.00 and —18.00 diopters. The present invention includes the grinding (or molding) of lenses employing for example the usual —6.00 diopters for the vertical base curve and, say, —12.00 diopters for the horizontal base curve, to form a compound base curve of —6.00 diopters = —12.00 diopters combining with this base curve convex or concave compound curves, either parallel or crossed which will produce most desired combinations.

It should be understood that these lenses usually would have their optical centers correspond to the distance between the pupils of the eyes of the wearer.

Also, in correcting visual defects, it is possible to determine the lens power necessary to correct the two principal meridians of the eye (usually at right angles to each other), and then to grind a cross-cylindrical lens, i. e., a lens which, instead of having a spherical curve on one side and a cylindrical curve on the other as in the case of the compound lens, has a cylinder ground on both sides of the lens (with the axes usually at right angles to each other), thereby correcting each of the two principal meridians of the eye with its own cylinder.

The term "spectacles" or "eye glasses" when used in the specification or claims includes the lenses of the same.

It will be understood that while there have been described herein and illustrated in the drawings certain embodiments of this invention, it is not intended thereby to have it limited to or circumscribed by the specific details or proportions, arrangement of parts, materials of construction, procedures and substances herein set forth or illustrated in the drawings, in view of the fact that this invention is susceptible to many and varied modifications according to individual preference and conditions without departing from the spirit of this disclosure and the scope of the appended claims.

I claim:

1. A pair of spectacles having lenses shaped to conform generally to the face of the wearer and to afford a wide field of vision, said lenses each having a principal portion and an extension, said principal portion and extension of each lens forming a continuous curve, said extension of each lens terminating adjacent the external canthus of the eye, the principal portion of each lens extending directly in front of the eye pupil of the user, the said principal portion and extension of each lens being formed to correct each of the two principal meridians of the eye and each having a horizontal base curve of between about —10.00 to —18.00 diopters, the inside and outside surfaces of each of said lenses being bitoric and the optical inner surface of the principal portion and said extension of each lens being a continuous toric curvilinear surface whereby corrected vision is maintained for straight ahead vision and vision when the eye is rotated in the extreme position toward the external canthus.

2. A pair of spectacles having lenses shaped to conform generally to the face of the wearer and to afford a wide field of vision, said lenses each having a principal portion and an extension, said principal portion and extension of each lens forming a continuous curve, said extension of each lens terminating adjacent the external canthus of the eye, the principal portion of each lens extending directly in front of the eye pupil of the user, the said principal portion and extension of each lens being formed to correct each of the two principal meridians of the eye and each having a vertical base curve of between about —6.00 to about —8.00 diopters and having a horizontal base curve of between about —10.00 to —18.00 diopters, the inside and outside surfaces of each of said lenses being bitoric and the optical inner surface of the principal portion and said extension of each lens being a continuous toric curvilinear surface whereby corrected vision is maintained for straight ahead vision and vision when the eye is rotated in the extreme position toward the external canthus.

3. A pair of spectacles having lenses shaped to conform generally to the face of the wearer and to afford a wide field of vision, said lenses each having a principal portion and an extension, said principal portion and extension of each lens forming a continuous curve, said extension of each lens terminating adjacent the external canthus of the eye, the principal portion of each lens extending directly in front of the eye pupil of the user, the said principal portion and extension of each lens being formed to correct each of the two principal meridians of the eye and each having a vertical base curve of —6.00 diopters and having a horizontal base curve of between about —10.00 to —18.00 diopters, the inside and outside surfaces of each of said lenses being bitoric and the optical inner surface of the principal portion and said extension of each lens being a continuous toric curvilinear surface whereby corrected vision is maintained for straight ahead vision and vision when the eye is rotated in the extreme position toward the external canthus, the said principal portion and extension of each lens having an angle of vision which is in exces of 90°.

4. A pair of spectacles having lenses shaped to conform generally to the face of the wearer and to afford a wide field of vision, said lenses each having a principal portion and extension, said principal portion and extension forming a continuous curve, the principal portion of which extends directly in front of the eye pupil of the user, the principal portion and the extension of each of said lenses being formed to correct each of the two principal meridians of the eye and having a vertical base curve of from about —6.00 to about —8.00 diopters and a horizontal base curve of about —12.00 diopters, the inside and outside surfaces of each of said lenses being bitoric and the optical inner surface of the principal portion and said extension of each lens being a continuous toric curvilinear surface whereby corrected vision is maintained for straight ahead vision and vision when the eye is rotated in the extreme position toward the external canthus, the said principal portion and extension of each lens having an angle of vision which is in excess of 90°.

5. A lens for spectacles shaped to conform generally to the face of the wearer and to afford a wide field of vision, said lens having a principal portion and an extension, said principal portion and extension forming a continuous curve, said extension terminating adjacent the external canthus of the eye, the principal portion of the lens adapted to extend directly in front of the eye pupil of the user, the principal portion and extension being formed to correct each of the two principal meridians of the eye, said lens having a horizontal base curve of between about —10.00 to —18.00 diopters, the inside and outside surfaces of said lens being bitoric and the optical inner surface of the principal portion and said extension being a continuous toric curvilinear surface whereby corrected vision is maintained for straight ahead vision and vision when the eye is rotated in the extreme position, toward the external canthus.

6. A lens for spectacles shaped to conform generally to the face of the wearer and to afford a wide field of vision, said lens having a principal portion and an extension, said principal portion and extension forming a continuous curve, said extension terminating adjacent the external canthus of the eye, the principal portion of the lens adapted to extend directly in front of the eye pupil of the user, the principal portion and extension being formed to correct each of the two principal meridians of the eye, said lens having vertical base curve of between about —6.00 to about —8.00 diopters and having a horizontal base curve of between about —10.00 to —18.00 diopters, the inside and outside surface of said lens being bitoric and the inner optical surface of the principal portion and said extension of said lens being a continuous toric curvilinear surface whereby corrected vision is maintained for straight ahead vision and vision when the eye is rotated in the extreme position toward the external canthus.

7. A lens for spectacles shaped to conform generally to the face of the wearer and to afford a wide field of vision, said lens having a principal portion and an extension, said principal portion and extension forming a continuous curve, said extension terminating adjacent the external canthus of the eye, the principal portion of the lens adapted to extend directly in front of the eye pupil of the user, the principal portion and extension being formed to correct each of the two principal meridians of the eye and said lens having a vertical base curve of —6.00 diopters and having a horizontal base curve of between about —10.00 to —18.00 diopters, the inside and outside surface of said lens being bitoric and the optical inner surface of the principal portion and said extension of said lens being a continuous toric curvilinear surface whereby corrected vision is maintained for straight ahead vision and vision when the eye is rotated in the extreme position toward the external canthus, the principal portion and extension of said lens having an angle of vision which is in excess of 90°.

8. A lens for spectacles shaped to conform generally to the face of the wearer and to afford a wide field of vision, said lens having a principal portion and an extension, said principal portion and extension forming a continuous curve, said extension terminating adjacent the external canthus of the eye, the principal portion of the lens adapted to extend directly in front of the eye pupil of the user, the principal portion and extension being formed to correct each of the two principal meridians of the eye, and having a vertical base curve of from about —6.00 to about —8.00 diopters and a horizontal base curve of about —12.00, the inside and outside surfaces of said lens being bitoric and the optical inner surface of the principal portion and said extension being a continuous toric curvilinear surface whereby corrected vision is maintained for straight ahead vision and vision when the eye is rotated in the extreme position toward the external canthus, the said principal portion and the extension of each lens having an angle of vision which is in excess of 90°.

ERNEST B. GATTEN.

REFERENCES CITED

The following references are of record in the file of this patent:

UNITED STATES PATENTS

| Number | Name | Date |
|---|---|---|
| 989,645 | Von Rohr | Apr. 18, 1911 |
| 1,697,030 | Tillyer | Jan. 1, 1929 |
| 2,179,286 | English | Nov. 7, 1939 |
| 2,394,934 | Oser et al. | Feb. 12, 1946 |
| 2,443,422 | Hausen | June 15, 1948 |